(12) United States Patent
Rickman

(10) Patent No.: US 6,928,029 B2
(45) Date of Patent: Aug. 9, 2005

(54) COMBINATION TAPE MEASURE AND RANGE FINDER

(76) Inventor: Brandon Rickman, 2546 Octavia La., Marietta, GA (US) 30062

( * ) Notice: Subject to any disclaimer, the term of this patent is extended or adjusted under 35 U.S.C. 154(b) by 0 days.

(21) Appl. No.: 10/717,758

(22) Filed: Nov. 20, 2003

(65) Prior Publication Data

US 2005/0111301 A1    May 26, 2005

(51) Int. Cl.[7] ............ G01S 15/00; G01B 3/10

(52) U.S. Cl. ............ 367/99; 33/760; 33/770

(58) Field of Search ............ 33/755, 759, 760, 33/770; 367/99

(56) References Cited

U.S. PATENT DOCUMENTS

| | | | | |
|---|---|---|---|---|
| 5,287,627 A | * | 2/1994 | Rando | 367/99 |
| 5,426,863 A | * | 6/1995 | Biggel | 33/763 |

FOREIGN PATENT DOCUMENTS

WO     WO 01/91978 A2 *  12/2001

* cited by examiner

Primary Examiner—Ian J. Lobo
(74) Attorney, Agent, or Firm—Marshall, Gerstein & Borun LLP

(57) ABSTRACT

A measuring apparatus includes a housing with a retractable tape, a waveform range finder, and a laser pointer disposed within the housing. The retractable tape includes indicia corresponding to a distance. A save button is further disposed on the housing, wherein upon the depression of the save button, the distance measured by waveform range finder is saved to a memory. A display on the housing indicates the dimension measured by the waveform range finder.

21 Claims, 2 Drawing Sheets

COMBINATION TAPE MEASURE AND RANGE FINDER

FIELD OF THE DISCLOSURE

The present disclosure relates to a measuring apparatus, and more particularly to a singularly housed retractable tape measure and range finder.

BACKGROUND OF THE DISCLOSURE

In the construction trades, many distances need to be measured quickly and accurately. These distances include the lengths of lumber to be cut, the internal dimensions of a room, dimensions of objects to be placed in rooms and through doorways, distances from a point to a house, and so on. For many years, the tool of choice for each of these dimensions was the conventional retractable tape measure. As is known, the retractable tape measure includes a tape wound about itself inside a housing that is spring loaded such that when the tape is extended and released, the tape is pulled back within the housing. The tape includes indicia to indicate to the user the distance measured. The tape measure can measure any distance, including the length to which a piece of lumber must be cut.

The tape measure is an excellent tool, but extending the tape over a long distance can be somewhat clumsy and slow. To address this issue, a sonic range finder was developed. In use of this tool, the user points the range finder at a specified target and presses a button. The range finder emits a waveform which is then reflected off the target back to the range finder. The ranger finder calculates the distance from itself to the target by measuring the time it takes for the reflected waveform to return.

The sonic range finder is also an excellent tool, however it is limited in that it can only measure internal dimensions, and not external dimensions. The term internal dimension is used to define a dimension in which at least one of the endpoints includes an inner surface facing the other of the endpoints. The term external dimension, on the other hand, is used to define a dimension in which neither of the endpoints include an inner surface that faces the other of the endpoints.

Thus, the dimension between a first and a second wall is an internal dimension, and the sonic range finder can measure such a dimension quickly and accurately, because the waves can be reflected off either wall. However, the dimensions of a piece of lumber are an external dimension, because there is no surface at the end of the piece of lumber to reflect the waveform. Thus, a sonic range finder cannot measure the length of a piece of lumber or the dimensions of a dresser, for example. Further, the sonic range finder cannot indicate a cut location on a piece of lumber at which point the user needs to cut the lumber to a predetermined length.

Thus, a user must carry both tools to be efficient. In many situations a user will measure the dimensions inside a room, then cut lumber to fit therein. The user first uses the sonic range finder to measure the internal dimensions of the room. The user then puts away the sonic range finder and grasps a tape measure. The user can then measure the lumber to be cut to fit within the room.

Figure 2:
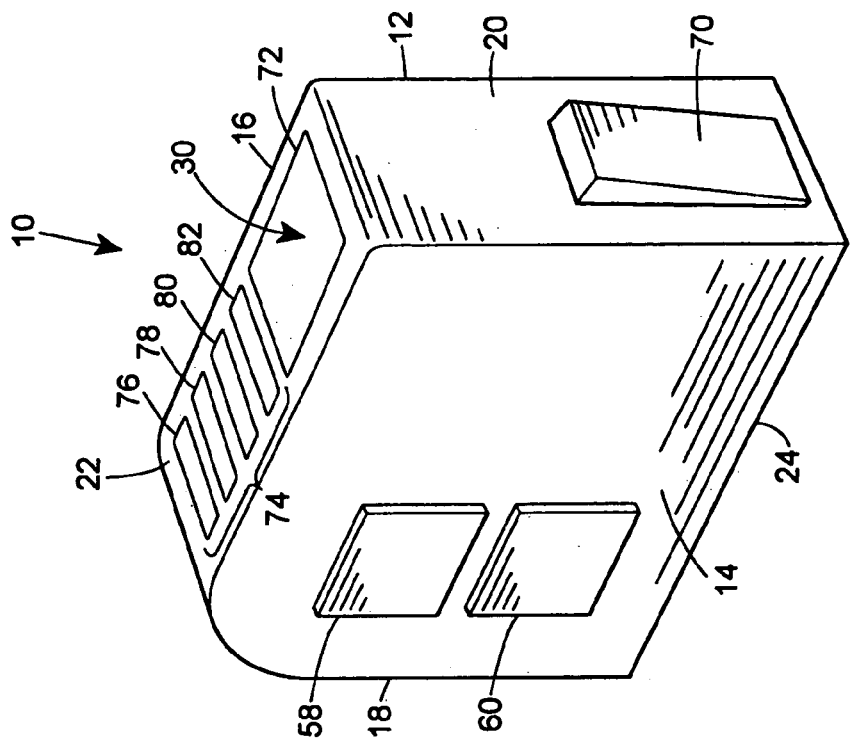
FIG. 2 is a second perspective view of the combination measuring apparatus of FIG. 1.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and the equivalents falling within the spirit and scope of the invention as defined by the appended claims.

DETAILED DESCRIPTION

Figure 1:
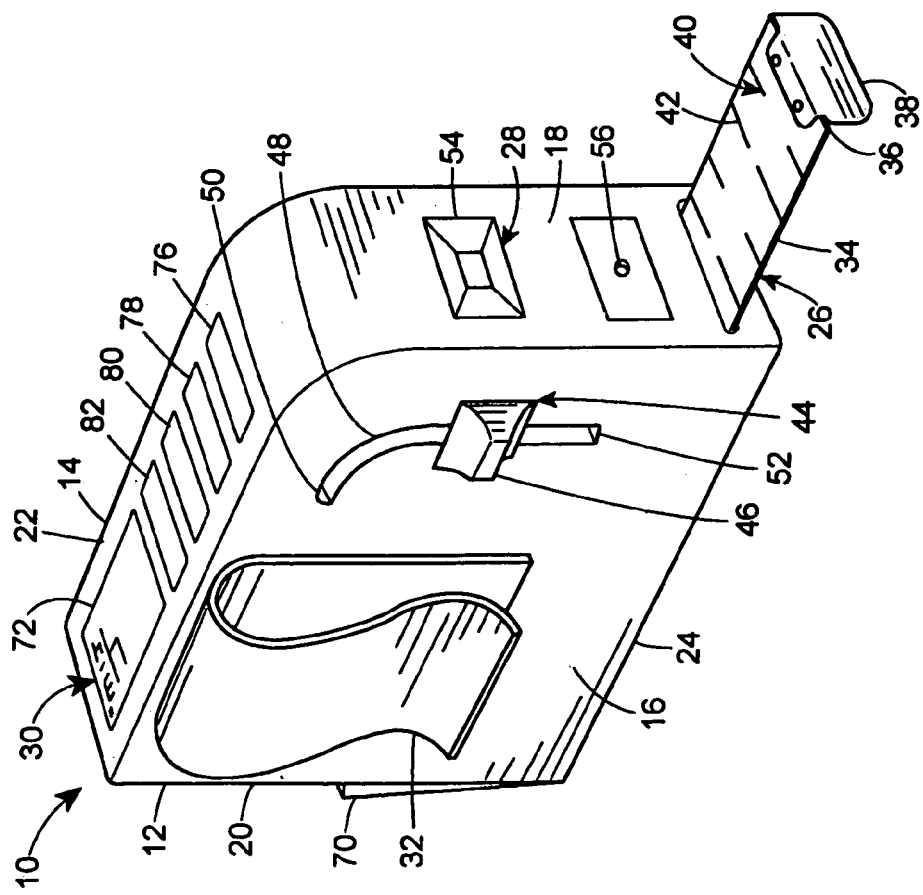
FIG. 1 is a perspective view of a combination measuring apparatus, constructed in accordance with the teachings of this disclosure.

Referring now to the drawings, and in particular to FIGS. 1 and 2, a combination tape measure and waveform range finder assembly 10 is disclosed. The assembly 10 includes a housing 12. The housing can include a left side 14, a right side 16, a front side 18, a back side 20, a top side 22, and a bottom side 24. Disposed within the housing 12 is a tape measuring unit 26, a waveform range finder unit 28, and a display unit 30. Further disposed on the housing is a belt clip 32 which the user can employ to store the assembly 10 on his or her belt. In this example, the belt clip 32 is disposed on the right side 16.

The tape measuring unit 26 includes a retractable tape 34 with a free end 36. A hook 38 is fastened to the free end 36. In FIG. 1, the retractable tape 34 is shown in an extended position in which the free end 36 has been pulled away from the housing 12. The retractable tape 34 includes indicia 40, disposed along its length. The indicia 40 comprise a plurality of individual marks 42 that indicate a distance from the free end 36 to that individual mark 42, as is known. The retractable tape 34 is wound about itself into a winding (not seen) inside the housing 12. The retractable tape 34 is spring loaded such it is urged back into the housing 12 and onto the winding, as is known.

The tape measuring unit 26 further includes a thumb lock 44. The thumb lock 44 includes a thumb lever 46 that is disposed in a slot 48 in the housing 12 and is slidable between a first end 50 and a second end 52 of the slot 48. When the thumb lever 46 is adjacent the first end 50, the retractable tape 34 can move freely, albeit either with or against the force generated by the spring loading. When the thumb lever 46 is adjacent the second end 52, the retractable tape 34 is locked and cannot extend or retract from the position that it is in. This functionality of locking the retractable tape 34 in a position is well known by those of skill in the art.

In another example not shown, the retractable tape 34 can include optical markings such that the distance indicated by the retractable tape can be read photoelectrically and the measurement can be stored digitally. Such a system is disclosed in U.S. Pat. No. 5,433,014 to Falk, et. al.

The waveform range finder unit 28 includes a cone 54 disposed on the front side 18 of the housing 12. Inside the cone 54 is a pulse generator (not seen). A laser 56 is also disposed on the front side 18 of the housing 12. A read button 58 and laser button 60 are both disposed on the left side 14 of the housing 12.

Figure 3:
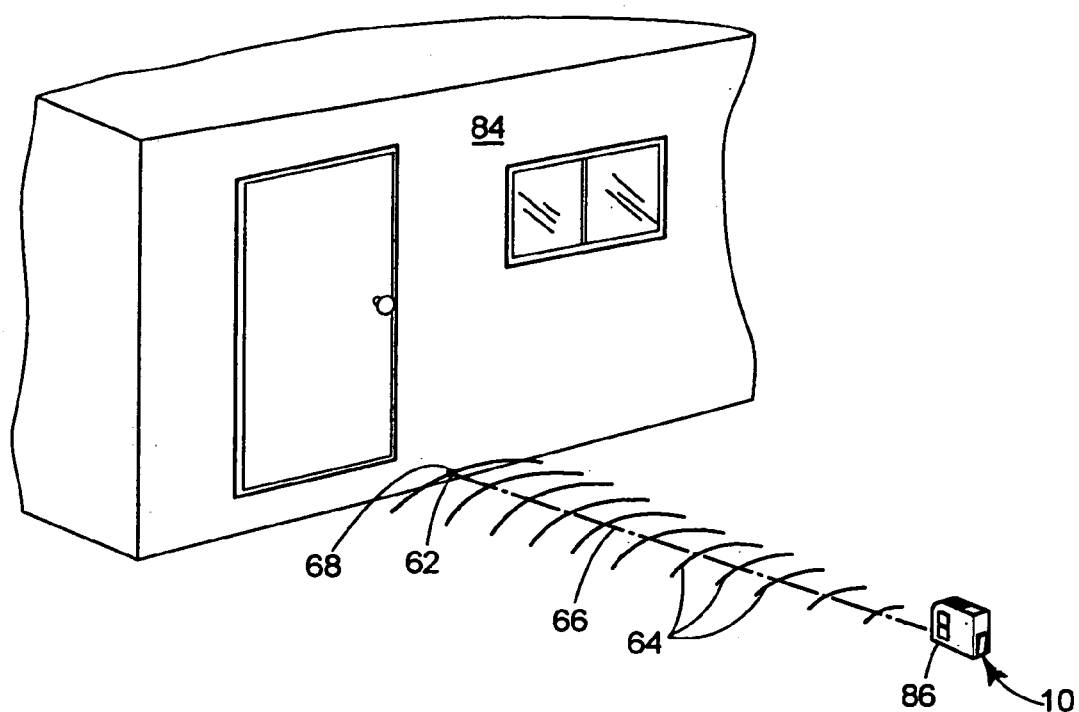
FIG. 3 depicts the apparatus of FIG. 1 being used to measure an internal distance.

Referring now to FIG. 3, by pressing the read button 58, a dimension is measured from the housing 12 to a target 62.

When the read button 58 is pushed, the pulse generator emits waveform pulses 64. The cone 54 directs the pulses 64 to a predefined projection angle. The emitted pulses 64 travel to the target 62 and are reflected off the target 62 back to the housing 12. The distance between the housing 12 and the target 62 is calculated from the time interval between the emission of the pulses 64 and their return. Other waveform measuring devices are well known in the art. The scope of this disclosure includes all such devices and is in no way limited to the example given herein.

The target 62 can be located by pressing the laser button 60. When the laser button 60 is pressed, the laser 56 emits a laser beam 66 that projects linearly and results in a small dot 68 on the target 62. The laser beam 66 is substantially coaxial with the emitted pulses 64. The user of the device sees the dot 68 on the target 62 and understands that the distance being measured is between the housing 12 and the dot 68. Although in this example two separate buttons 58, 60 are shown, it is possible for a single button to actuate both the pulse generator and the laser 56.

Referring back to FIGS. 1 and 2, the waveform range finder unit 28 can further include a switch 70 disposed on the back side 20 of the housing 12. In one example, when the switch 70 is not engaged, the waveform range finder unit 28 calculates the dimension from the target 62 to the front 18 of the housing 12. In this example, when the switch 70 is engaged, such as when the back side 20 of the housing 12 is placed flush against a wall, the waveform range finder unit 28 calculates the dimension from the target 62 to the back side 20 of the housing 12. In another example not shown, a two-position thumb-actuated switch can be implemented to instruct the waveform range finder unit 28 to measure from the target 62 to either the front side 18 or the back side 20 of the housing 12. In another example, the waveform range finder unit 28 does not include any type of switch 70, and only measures from either the front side 18 of the housing 12 or the back side 20 of the housing 12 to the target 62. Although this is the least flexible, it is the least expensive.

The display unit 30 includes a display window 72 (hereinafter "window") and a plurality of control buttons 74 adapted to control the display in the window 72. The window 72 can be used to digitally display the dimension calculated by the waveform range finder unit 28. If the tape measuring unit 26 includes components to optically read and digitally store the measurements of the retractable tape 34 as detailed previously, the window 72 can digitally display that dimension, too.

The plurality of control buttons 74 can include a standard button 76, a metric button 78, a save button 80, and a toggle button 82. By pressing the standard button 76, the window 72 displays the dimensions in standard units. By pressing the standard button 76 multiple times, the display of the window 72 switches between a first display of feet and inches (i.e., 6 feet 2 inches) to a second display of total inches (i.e., 74 inches). Other units are, of course, possible.

By pressing the metric button 78, the window 72 displays the dimensions in metric units. By pressing the metric button 78 multiple times, the window 72 switches between a first display of meters to a second display of centimeters. Again, other units such as millimeters or decimeters are possible.

When the save button 80 is pressed, the dimension displayed in the window 72 is saved to a memory (not shown). The memory can save any number of dimension depending on the configuration of the controller, although it is believed that a total of five dimensions would be a sufficient amount to retain and not be confusing to the operator. For example, if 15 dimensions were stored, the user might not remember which dimension corresponded to which of the objects or distances that were measured. However, in other situations this may not be a problem, and it may be desirable to store a number of dimensions even greater than 15.

When the toggle button 82 is pressed, the window 72 displays a first of the saved dimensions. The first displayed dimension can be the most recently saved dimension. When the toggle button 82 is pressed again, a second of the saved dimensions is displayed. The second displayed dimension can be the next most recently saved dimension, and so forth. Thus, the user can sequentially review each of the saved dimensions by repeatedly pressing the toggle button 82.

Referring now to FIG. 3, to use the assembly 10, the housing 12 can be pointed at a target 62. In this example, the housing 12 is pointed at a cabin 84 in preparation for constructing a deck. The housing 12 is placed at an end location 86 where the end of the deck is desired to be. The laser button 60 is pressed to locate the target 62 on the cabin 84. The read button 58 is then pressed to determine the dimension between the end location 86 and the target 62. The dimension calculated by the waveform range finder unit 28 is then displayed on the window 72. If the user would like to change the units of the dimension displayed in the window, the standard button 76 or the metric button 78 can be pressed. The dimension can then be saved into the memory by depressing the save button 80.

Figure 4:
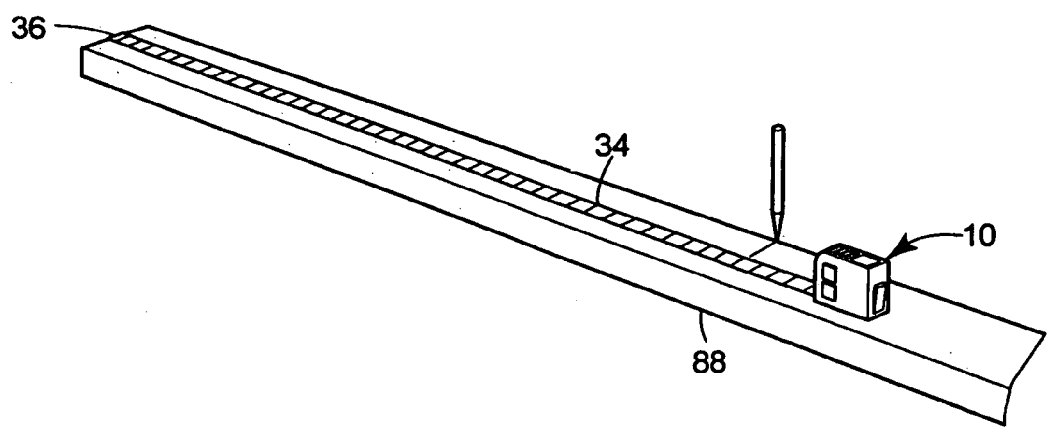
FIG. 4 depicts the apparatus of FIG. 1 being used to measure an external distance of an object related to the internal distance of FIG. 3.

Referring now to FIG. 4, lumber 88 can then be cut to build the deck. The assembly 10 can then be placed on the piece of lumber 88 with the hook 38 on the free end 36 disposed about the end of the piece of lumber 88. The retractable tape 34 can be extended as is known to locate the desired cut length. If the user has forgotten the dimension measured by the waveform range finder unit 28, the dimension can be accessed by pressing the toggle button 82 until the desired dimension is displayed.

Thus, assembly 10 can quickly and efficiently measure both internal and external dimensions. The waveform range finder unit 28 can measure the internal dimension between a first endpoint and a second endpoint. In the example detailed herein, the cabin 84 provides the inner surface facing the end location. The tape measuring unit 26 can measure an external dimension between a third endpoint and a fourth endpoint. In the example detailed herein, the dimension of the length of the piece of lumber 88 is an external dimension because neither of the endpoints include an inner surface that faces the other of the endpoints. By using a single piece of equipment, both internal and external dimensions can be measured and saved, thereby saving time and improving accuracy. The user does not have to carry separate pieces of equipment. Further, by using the save function, the dimensions can be stored directly in the assembly 10 itself, thereby eliminating the possibility that the user will forget or lose the dimension, i.e., lose a piece of paper the dimension was written on, prior to cutting a piece of lumber related to the dimension.

The shape of the housing 12 disclosed in FIGS. 1–4 is that of a typical tape measure that is extended on its front side 18 to accommodate the extra components such as the display unit 30 and the waveform range finder unit 28. However, those of ordinary skill in the art may determine a different configuration for a housing 12 that includes the components detailed herein. Accordingly, the claims as detailed herein shall in no way be limited to the configuration and/or layout of the housing 12 as disclosed in the FIGS. 1–4.

From the foregoing, one of ordinary skill in the art will appreciate that the present disclosure sets forth a measuring apparatus. However, one of ordinary skill in the art could readily apply the novel teachings of this disclosure to any number of situations. As such, the teachings of this disclosure shall not be considered to be limited to the specific examples disclosed herein, but to include all applications within the spirit and scope of the invention.

I claim:

1. A measuring apparatus, comprising:
   a housing;
   a retractable tape with a first end, the retractable tape being disposed within the housing, the first end of the retractable tape extendible out of the housing in a first direction, the retractable tape including indicia corresponding to a distance from the first end of the tape and adapted to measure an external dimension; and
   a waveform range finder disposed within the housing, the waveform range finder configured to emit a waveform substantially in the first direction to measure an internal dimension from a target to the housing.

2. The apparatus of claim 1, further comprising a laser pointer disposed within the housing.

3. The apparatus of claim 1, further comprising a window adapted to display a dimension measured.

4. The apparatus of claim 3, wherein the window is adapted to display the dimension measured by the waveform range finder.

5. The apparatus of claim 4, wherein the housing has a back side and a front side, wherein the internal dimension measured is from the target to the front side, wherein the distance from the back side to the front side defines a predetermined distance, the apparatus further comprising a switch on the back side, wherein the window is adapted to display the dimension measured plus the predetermined distance when the switch is engaged during measuring.

6. The apparatus of claim 3, wherein the window is adapted to display the dimension measured by the retractable tape.

7. The apparatus of claim 3, further comprising a standard button configured to direct the window to display the dimension measured in standard units, the standard units including inches and feet or inches.

8. The apparatus of claim 3, further comprising a metric button configured to direct the window to display the dimension measured in metric units, the metric units including meters or centimeters.

9. A measuring apparatus, comprising:
   a housing;
   a retractable tape disposed within the housing, the retractable tape including indicia corresponding to a distance and adapted to measure an external dimension;
   a waveform range finder disposed within the housing, adapted to measure an internal dimension;
   a window adapted to display a dimension measured; and
   a save button configured to direct the dimension measured to be saved in a memory, wherein the memory can save a plurality of dimensions.

10. The apparatus of claim 9, further comprising a toggle button configured to display one of the plurality of saved dimensions in the window each time the toggle button is pressed.

11. The apparatus of claim 1, further comprising a lever to lock the retractable tape.

12. A method of measuring an internal dimension and external dimension with a device, the device having a housing, the method comprising:
    engaging a waveform range finder within the housing to measure the internal dimension from the housing to a targeted location; and
    extending a retractable tape from within the housing across an item that corresponds to the targeted location to measure the external dimension of the item.

13. The method of claim 12, further comprising pointing a laser light from within the housing at the targeted location.

14. The method of claim 12, further comprising displaying either the internal dimension or the external dimension on a display.

15. The method of claim 14, further comprising depressing a button on a back side of the housing while engaging the waveform range finder.

16. The method of claim 15, further comprising displaying the internal dimension plus the distance from the back side to the front side of the housing on a window.

17. The method of claim 14, further comprising depressing a standard button on the housing to display the dimension measured in either inches or feet and inches.

18. The method of claim 14, further comprising depressing a metric button on the housing to display the dimension measured in either meters or centimeters.

19. A method of measuring an internal dimension and external dimension with a device, the device having a housing, the method comprising:
    engaging a waveform range finder within the housing to measure the internal dimension from the housing to a targeted location;
    extending a retractable tape from within the housing across an item that corresponds to the targeted location to measure the external dimension of the item;
    displaying either the internal dimension or the external dimension on a display; and
    depressing a save button to save a dimension measured into a memory.

20. The method of claim 19, further comprising depressing a toggle button to sequentially review the dimensions saved into the memory.

21. A measuring apparatus, comprising:
    a housing;
    a retractable tape disposed within the housing, the retractable tape including indicia corresponding to a distance and adapted to measure an external dimension;
    a waveform range finder disposed within the housing and adapted to measure an internal dimension;
    a laser pointer disposed within the housing;
    a save button disposed on the housing, wherein upon the depression of the save button, the internal dimension measured by waveform range finder is saved to a memory; and
    a display window disposed on the housing, wherein the display is adapted to display the internal dimension measured by the waveform range finder.

* * * * *